United States Patent
Yoshitomi et al.

(10) Patent No.: US 9,318,933 B2
(45) Date of Patent: Apr. 19, 2016

(54) STEPPING MOTOR WITH SNAPPING FRONT BOSS AND SECURING PINS

(71) Applicant: MINEBEA CO., LTD., Kitasaku-gun, Nagano (JP)

(72) Inventors: Shoji Yoshitomi, Fukuroi (JP); Masato Hata, Fukuroi (JP); Kazuo Muramatsu, Fukuroi (JP); Masatomo Komaki, Fukuroi (JP)

(73) Assignee: Minebea Co., Ltd., Kitasaku (JP)

( * ) Notice: Subject to any disclaimer, the term of this patent is extended or adjusted under 35 U.S.C. 154(b) by 301 days.

(21) Appl. No.: 13/936,693

(22) Filed: Jul. 8, 2013

(65) Prior Publication Data
US 2014/0028128 A1    Jan. 30, 2014

(30) Foreign Application Priority Data
Jul. 30, 2012    (JP) ................. 2012-168326

(51) Int. Cl.
*H02K 11/00* (2006.01)
*H02K 1/18* (2006.01)
*H02K 3/52* (2006.01)
(Continued)

(52) U.S. Cl.
CPC ............ *H02K 11/0068* (2013.01); *H02K 1/185* (2013.01); *H02K 3/525* (2013.01); *H02K 5/15* (2013.01); *H02K 5/1672* (2013.01); *H02K 2203/03* (2013.01)

(58) Field of Classification Search
CPC ... H02K 11/0068; H02K 1/185; H02K 3/525; H02K 5/15; H02K 5/1672; H02K 2203/03

USPC .......... 310/71, 49.01, 49.12, 49.32, 68 R, 91
IPC ....................................... H02K 11/00
See application file for complete search history.

(56) References Cited

U.S. PATENT DOCUMENTS

| 5,389,846 | A | * | 2/1995 | Okazaki | ................. | H02K 3/525 |
| | | | | | | 310/40 MM |
| 5,770,900 | A | * | 6/1998 | Sato | ....................... | H02K 3/525 |
| | | | | | | 310/194 |
| 5,973,428 | A | * | 10/1999 | Zakrocki et al. | ................ | 310/71 |

(Continued)

FOREIGN PATENT DOCUMENTS

| JP | H04-72872 U | 6/1992 |
| JP | H04-271244 A | 9/1992 |

(Continued)

OTHER PUBLICATIONS

Definition of the term "Solder"—Merriam-Webster.com.*

(Continued)

*Primary Examiner* — John K Kim
(74) *Attorney, Agent, or Firm* — Oliff PLC

(57) ABSTRACT

A structure reliably secures a stepping motor to a circuit board. The stepping motor has an axially protruding boss portion accommodating a shaft in the inside, which boss portion is provided to be snapped into a circuit board, axially protruding current conducting terminal pins that are made so as to be soldered to the circuit board, and securing pins not functioning as electrodes, which securing pins are made so as to be soldered to the circuit board and are arranged in a position whereby they sandwich the boss portion between themselves and the current conducting terminal pins.

11 Claims, 5 Drawing Sheets

(51) Int. Cl.
*H02K 5/15* (2006.01)
*H02K 5/167* (2006.01)

(56) References Cited

U.S. PATENT DOCUMENTS

| | | | | |
|---|---|---|---|---|
| 5,977,670 | A * | 11/1999 | Numaya | H02K 3/525 310/49.05 |
| 6,232,690 | B1 * | 5/2001 | Schmider | F04D 25/0653 310/112 |
| 6,455,962 | B2 * | 9/2002 | Suzuki | H02K 3/525 310/194 |
| 6,534,888 | B1 * | 3/2003 | Vorberg et al. | 310/91 |
| 7,446,442 | B2 * | 11/2008 | Horiike | H02K 1/145 310/257 |
| 8,928,193 | B2 * | 1/2015 | Yoshitomi | G01R 7/06 310/261.1 |
| 2005/0006960 | A1 * | 1/2005 | Matsushita | H02K 1/145 310/49.08 |
| 2005/0264113 | A1 * | 12/2005 | Suzuki | F16K 31/04 310/80 |
| 2008/0191566 | A1 * | 8/2008 | Lin | H02K 3/525 310/71 |
| 2012/0161552 | A1 * | 6/2012 | Yoshitomi et al. | 310/48 |

FOREIGN PATENT DOCUMENTS

| | | |
|---|---|---|
| JP | H06-112621 A | 4/1994 |
| JP | 2001066164 A * | 3/2001 |
| JP | A-2001-66161 | 3/2001 |

OTHER PUBLICATIONS

Definition of the term "Substrate"—Dictionary.com.*
Machine Translation of JP 2001066164 A.*
Definition of the term "Solder"—Merriam-Webster.com, Jul. 7, 2015.*
Definition of the term "Substrate"—Dictionary.com, Jun. 30, 2015.*
Feb. 24, 2016 Office Action issued in Japanese Application No. 2012-168326.

* cited by examiner

STEPPING MOTOR WITH SNAPPING FRONT BOSS AND SECURING PINS

BACKGROUND OF THE INVENTION

1. Field of the Invention

The present invention relates to a stepping motor that has a special feature in the structure for securing the motor to a circuit board.

2. Description of Related Art

Stepping motors that are directly secured to a circuit board are well known (See, for example Japanese Unexamined Patent Application Laid-open No. 2001-66161). In this structure, current conducting terminal pins are arranged at the end surface of the stepping motor, which is then secured to the circuit board by soldering the current conducting terminal pins directly to the circuit board.

SUMMARY OF THE INVENTION

If an arrangement of current conducting terminal pins is employed as described in Japanese Unexamined Patent Application Laid-open No. 2001-66161, the distance between the current conducting terminal pins increases, thus limiting the wire guiding from a stator coil to the current conducting terminal pins. This leads to problems such as inferior working efficiency, breaking of wires due to compulsory wire guiding and design limitation. In view of these circumstances, the present invention intends to provide a structure for securing a stepping motor to a circuit board reliably, whereby limitations for wire guiding inside the motor are mitigated.

In a first aspect of the present invention, a stepping motor has an axially protruding boss portion accommodating a rotation axis in the inside, which boss portion is provided to be snapped into the circuit board, axially protruding current conducting terminal pins that are made so as to be soldered to the circuit board, and securing pins that are made so as to be soldered to the circuit board and are arranged in a position whereby they sandwich the boss portion between themselves and the current conducting terminal pins.

According to the invention according to the first aspect of the present invention, the current conducting terminal pins and the securing pins, which are arranged such that they sandwich the boss portion at the center of rotation, are secured to the circuit board by soldering. According to this structure, the boss portion at the center of rotation is secured to the circuit board by snapping in, whereby the current conducting terminal pins and the securing pins are secured to the circuit board by soldering, such that they sandwich the boss portion between themselves. Assumed that a structure is employed in which only the current conducting terminal pins are soldered to the circuit board, stress is concentrated at the current conducting terminal pins. However, since the present invention relates to a structure in which soldering is performed at two locations sandwiching the boss portion therebetween, stress concentration to the current conducting terminal pins can be avoided. Furthermore, since the stepping motor is secured to the circuit board by using the securing pins in addition to the current conducting terminal pins, there is a high flexibility for arranging the current conducting terminal pins, and limitations for the wire guiding from a stator coil to the current conducting terminal pins are mitigated.

According to a second aspect of the present invention, together with the first aspect of the present invention, the current conducting terminal pins and the securing pins are provided at equal angular positions. According to the second aspect of the present invention, there is a well balanced arrangement of the current conducting terminal pins and the securing pins, whereby stress concentration at the current conducting terminal pins can be restrained. Furthermore, a structure for steadily securing the stepping motor to the circuit board can be obtained.

According to the present invention, a structure in which limitations for wire guiding inside the motor are mitigated, is provided on the basis of a structure in which the stepping motor can be reliably secured to the circuit board.

PREFERRED EMBODIMENT OF THE INVENTION

Figure 1A:
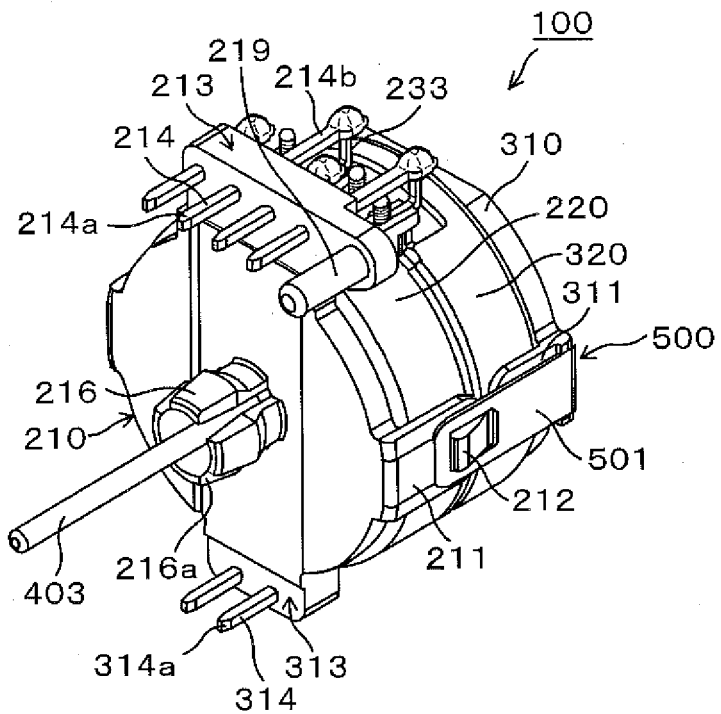
FIG. 1A is a perspective view of a stepping motor of an embodiment.
Figure 1B:
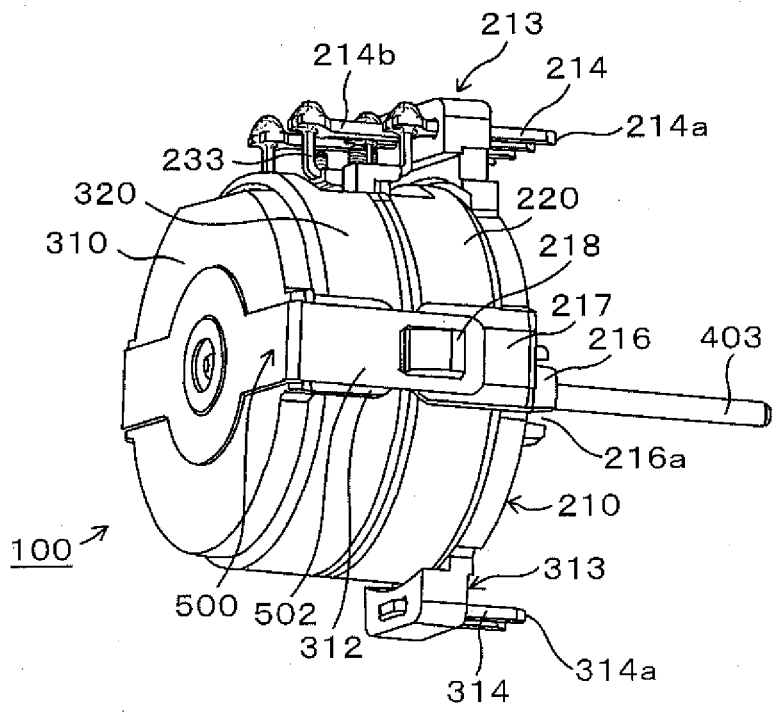
FIG. 1B is a perspective view of the stepping motor of an embodiment viewed from another angle.
Figure 2:
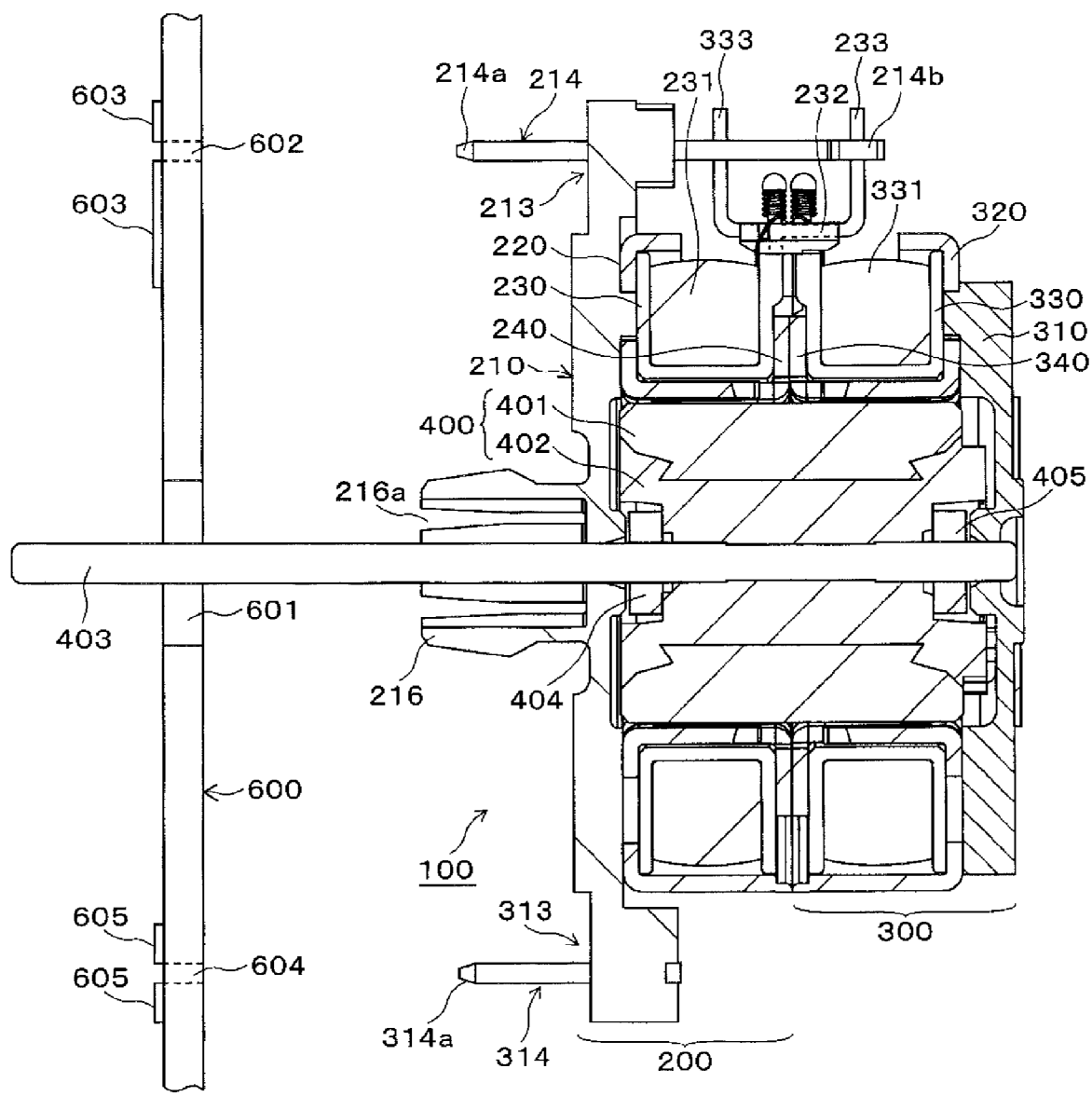
FIG. 2 is a cross sectional view of a stepping motor of an embodiment.

FIG. 1A, FIG. 1B, and FIG. 2 show a stepping motor 100 of an embodiment (first embodiment). The stepping motor 100 is a claw pole stepping motor. As shown in FIG. 2, the stepping motor 100 has a structure as a stator-side structure whereby a front side stator assembly 200 and an end side stator assembly 300 are connected in an axial direction. Furthermore, a rotor 400 is accommodated, freely rotatable in the inside of a structure by combining a front side stator assembly 200 and a back side stator assembly 300 in an axial direction.

Figure 3A:
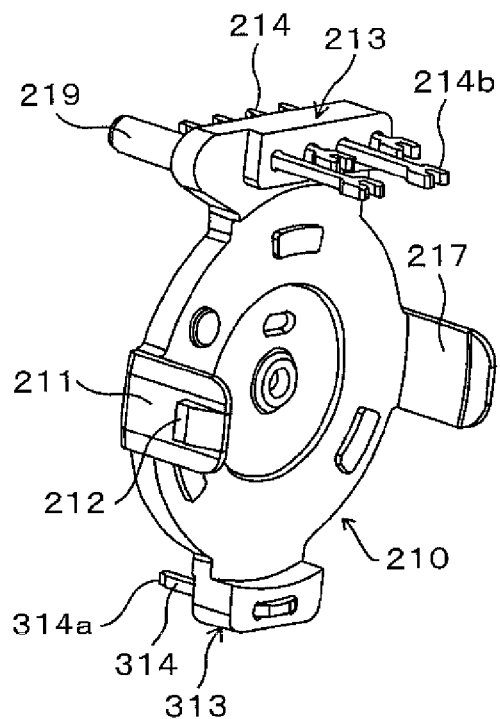
FIG. 3A is a perspective view of the front plate of an embodiment, viewed from the back side.
Figure 3B:
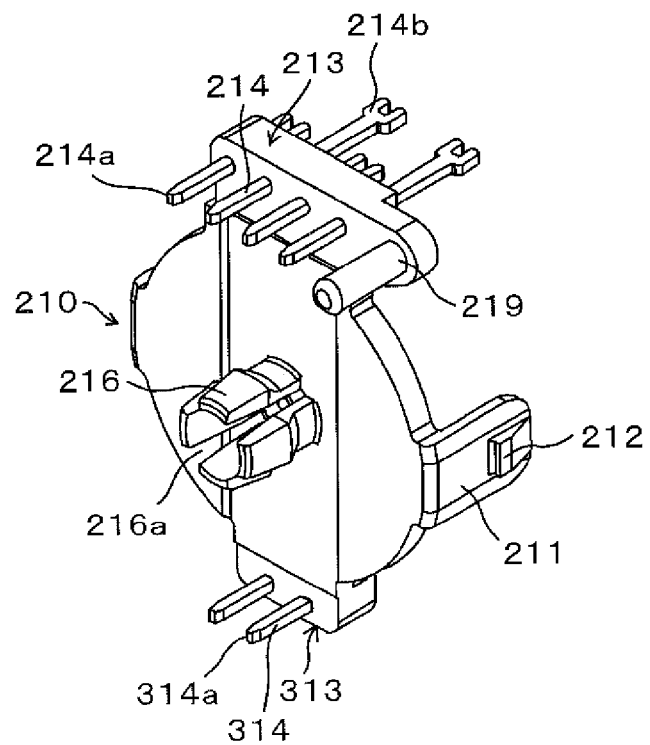
FIG. 3B is a perspective view of the front plate of an embodiment, viewed from the front side.

The front side stator assembly 200 consists of a front plate 210, an outer stator 220, a bobbin 230, and an inner stator 240. The front plate 210 is a virtually disk-shaped member formed from injection molded resin. FIG. 3A and FIG. 3B show a perspective view of the front plate, each from a different direction. The front plate has a band-joint 211 that extends in an axial direction from a virtually disk-shaped edge portion. The band-joint 211 is provided with a claw 212 protruding to the outside. Furthermore, a band-joint 217 and a claw 218 of the same type are provided at the opposite side, beyond the axis. The band-joint 211 is joined with a band 500, which will be described later. Because the band-joint 211 is jointed with the band 500, the front side stator assembly 200 and the end side stator assembly 300 are tightly secured and jointed.

The front plate 210 has a terminal portion 213 which is integrally formed with the front plate 210. Four metallic current conducting terminal pins 214 are embedded in the terminal portion 213, which serve as current conducting terminals to a circuit board 600. The current conducting terminal pins 214 are provided with axially protruding end portions 214a to be inserted into contact holes 602 of the circuit board 600, and end portions 214b that are to make contact with terminals 233 and 333, to which the wirings from stator coils 231 and 331 are connected. The end portions 214b and the portions to which the terminals 233 and 333 at which the wirings from the coil 231 and 331 are connected, are joined by welding. FIG. 2 shows the stepping motor as it is to be secured to the circuit board 600 or the stepping motor as it is to be separated from the circuit board 600. It should be noted that the actual circuit board 600 is provided with various kinds of electronic devices, which are not shown in FIG. 2.

The front plate 210 is provided with an integrally formed securing pin arranging portion 313. The securing pin arranging portion 313 is provided at a position symmetrical to the terminal portion 213, with a boss portion 216 in the center. That is, the boss portion 216 (a shaft 403 defining a rotation axis) is located near the center (it does not have to be exactly at the center) of the line linking the terminal portion 213 and the securing pin arranging portion 313. Two axially protruding securing pins 314 are arranged at the securing pin arranging portion 313. The securing pins 314 are virtually U-shaped metallic members that are inserted and secured in bores which are provided in the securing pin arranging portion 313. The securing pins 314 are made from a material that can be soldered, and they serve to secure the stepping motor 100 to the circuit board 600, but they do not function as current conducting terminals.

The front plate 210 provides an integrally formed boss portion 216 that protrudes in an axial direction. A plurality of slits 216a extending in an axial direction are formed, in which the boss portion has a virtually cylindrical shape, accommodating the rotor side shaft 403 in a freely rotatable manner therein. Furthermore, the front plate 210 is provided with a positioning pin 219 that serves to position the front plate at the circuit board 600 (see FIG. 1A, FIG. 3A, and FIG. 3B). The positioning pin 219 is a member made from resin that is formed integrally with the front plate 210. By inserting the positioning pin 219 into the positioning hole (not shown) that is provided on the circuit board 600, the stepping motor 100 is positioned against the circuit board 600.

The outer stator 220 and the inner stator 240 are portions that function as a stator yoke at which a magnetic path is formed, whereby these consist of magnetic material such as electromagnetic soft iron or rolled copper sheet. The structures of the outer stator 220 and the inner stator 240 are identical to that of a conventional claw pole stator.

The bobbin 230 is made from resin, in which the stator coil 231 is wound around this bobbin. The bobbin 230, around which the stator coil 231 is wound, is arranged in a donut shaped space (annular ring space) surrounded by the inner side of the outer stator 220 and the inner stator 240. The bobbin 230 has two terminal portions 232. In the terminal portions 232, metallic terminals 233 are embedded respectively, to which the end of the winding of the stator coil 231 is fastened and connected.

The end side stator assembly 300 is structured from an end plate 310, an outer stator 320, a bobbin 330, and an inner stator 340. Herein, the member of the outer stator 320 is the same as that of the outer stator 220, at which, for use, the location in an axial direction is reversed. The member of the bobbin 330 is the same as that of the bobbin 230, at which, for use, the location in an axial direction is reversed. The member of the inner stator 340 is the same as that of the inner stator 240, at which, for use, the location in an axial direction is reversed.

The end plate 310 is a virtually disk-shaped member, forming the end side housing, which plate is formed from injection molded resin. The end plate 310 has a band-contact 311 (see FIG. 1A and FIG. 1B), which makes contact with an arm 501 of the band 500 from the inside. The band-contact 311 makes contact with the arm 501 from the inside, where the arm 501 is deformed after assembling, and the arm is supported from their inside, so that the arm 501 does not come off from the front plate 210. The same function is available at the opposite side beyond the band-contact 311 and the axis, where a band-contact 312 is provided which makes contact with an arm 502 of the band 500.

The band 500 is a U-shaped elastic member made of metal. As shown in FIG. 1 and FIG. 3, the band 500 has at both ends arms 501 and 502 that extend in an axial direction. The arms 501 and 502 are provided with rectangular bores. The claws 212 and 218 of the band-joints 211 and 217 that are provided at the front plate 210 become engaged in these bores, whereby the band 500 engages with the plate 210.

The rotor 400 shown in FIG. 2 has a cylindrical rotor magnet 401. The rotor magnet 401 is secured to the outer periphery of a rotor member 402, and has a structure of magnetic poles in which they are alternatingly magnetized, such as NSNS, in a circumferential direction. The shaft 403, which defines a rotation axis, is secured in the center of axis of the rotor 400 (the rotor member 402). The shaft 403 is passed through bores that are provided in the front plate 210 and the end plate 310, and is free rotatably supported by making direct contact with the inner circumferential surfaces of those holes. It is also possible to free rotatably support the shaft 403 at the front plate 210 and the end plate 310 via bearings such as rolling bearings.

Cylindrical rubber washers 404 and 405 made of rubber are mounted to the shaft 403. The rubber washer 404 is located between the rotor 400 and the front plate 210, and the rubber washer 405 is located between the rotor 400 and the end plate 310. An impact caused by an axial backlash at the rotor 400 is absorbed by rubber washers 404 and 405.

Method for Securing the Stepping Motor to the Circuit Board

Hereafter, an example of a procedure for securing the stepping motor 100 to the circuit board 600 is explained. First, the positional relationship between the stepping motor and the circuit board 600 is to be set as shown in FIG. 2. Then, the stepping motor 100 has to be pressed to the circuit board 600, the boss portion 216 pushed into a boss portion bore 601, and the boss portion 216 pressed into the boss portion bore 601 provided for securing the motor. At this time, the boss portion 216 decreases in diameter because of the function of the slits 216a, where the boss portion 216 snaps into the boss portion bore 601 provided for securing the motor because of the repulsive force that tries to increase the diameter.

Here, the end portions 214a of the four current conducting terminal pins 214 are inserted in the contact hole 602 of the circuit board 600 while the stepping motor 100 is pressed against the circuit board 600. Furthermore, the securing pins 314 are inserted in the pin securing bores 604 of the circuit board 600. A conducting path pattern 603 (printed pattern) forming a circuit pattern is formed around the contact hole 602 where this conducting path pattern 603 and the current conducting terminal pins 214 are connected by soldering. Furthermore, a soldering pattern 605 around the pin securing bores 604 and the securing pins 314 are connected by soldering. As a result, the four current conducting terminal pins 214 and the two securing pins 314 are secured to the circuit board 600 by soldering. Herein, the soldering pattern 605 utilizes the conducting path pattern 603 of the circuit board 600 but does not function as an electrode. It is also possible to have the fastening pins make contact with a part of the metallic portions of the motor to make them function as the ground connection. Furthermore, the fastening pins may also be used as electrical contacts for, for example a rotary sensor, but not for coil windings.

Advantages

In this way, it is possible to provide a structure in which stress does not concentrate at the current conducting terminal pins 214. Furthermore, since the arrangement of the current conducting terminal pins 214 is not limited, a layout of wiring from the stator coils 231 and 331 to the terminals 233 and 333 can be made without limitation. Furthermore, since the soldering pattern 605 utilizes the conducting path pattern 603 provided on the circuit board 600, an increase in cost can be avoided.

Other Matters

Figure 5:
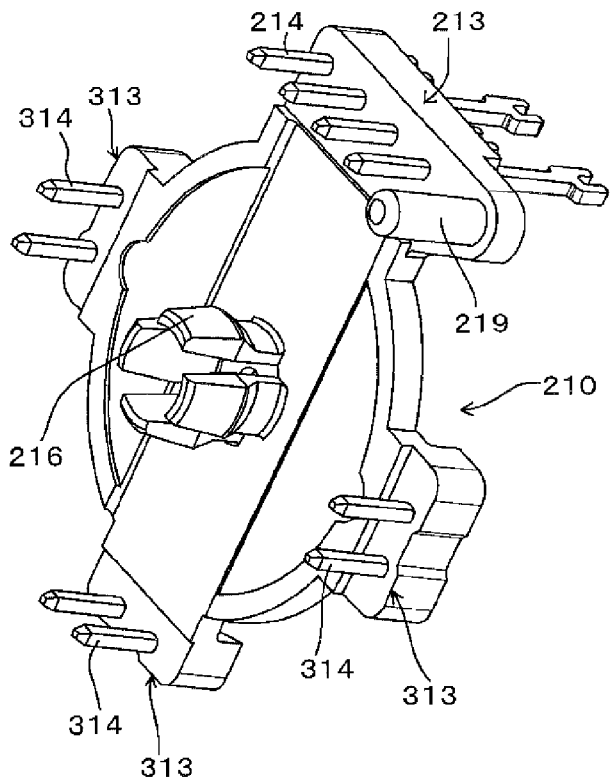
FIG. 5 is a perspective view of the front plate of a second embodiment.
Figure 6:
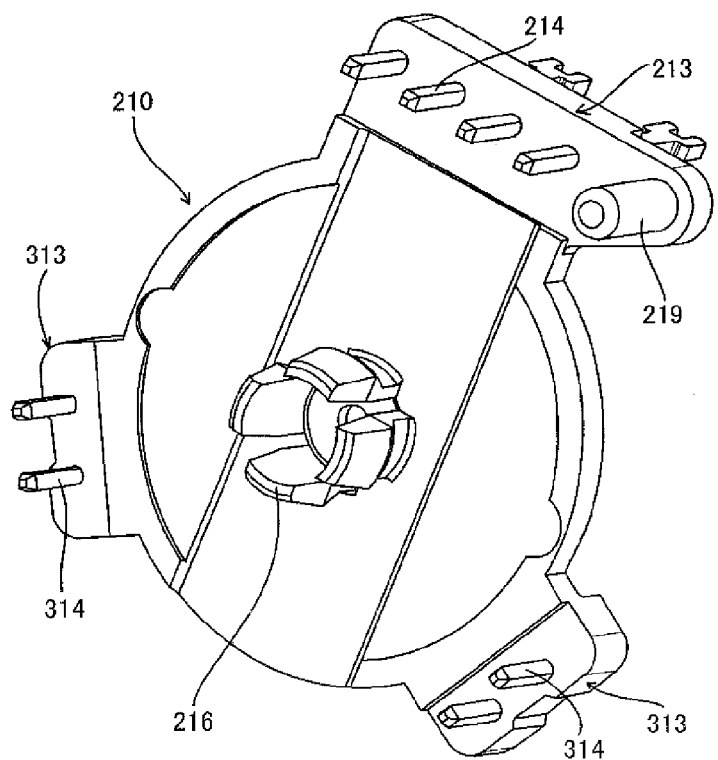
FIG. 6 is a perspective view of the front plate of a third embodiment.

FIGS. 1A to 3B show an example in which the current conducting terminal pins 214 and the securing pins 314 are arranged at positions sandwiching the center of rotation therebetween. However, it is also possible to make a structure in which additional securing pins are provided at left and right positions, viewed from an axial direction, and securing is performed by soldering the metallic pins at four places with an angular difference of 90 degrees from one to another, viewed from an axial direction, as shown in FIG. 5 (second embodiment). Furthermore, a structure is possible in which securing is performed by soldering the metallic pins at three places with an angular difference of 120 degrees from one to another, viewed from an axial direction, as shown in FIG. 6 (third embodiment). It should be noted that the number of current conducting terminal pins 214 and the securing pins 314 is not limited to the number shown in the figures.

Figure 4A:
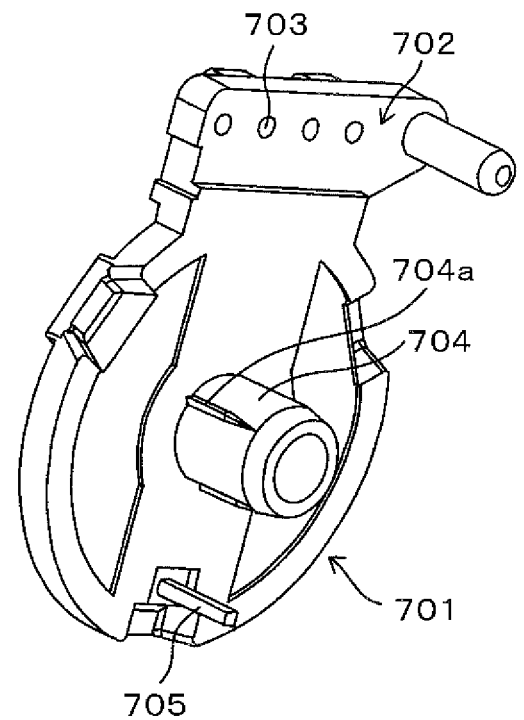
FIG. 4A is a perspective view of another front plate of an embodiment, viewed from the front side.
Figure 4B:
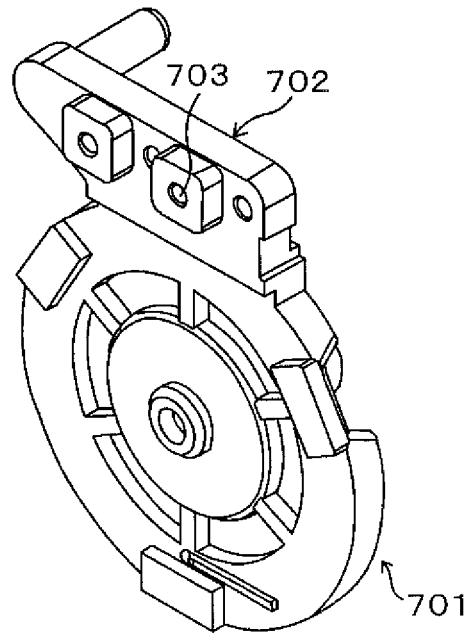
FIG. 4B is a perspective view of another front plate of an embodiment, viewed from the back side.

FIG. 4A and FIG. 4B show a different example of a front plate. In the example shown in FIG. 4A and FIG. 4B, a front plate 701 has a terminal portion 702. The terminal portion 702 has bores 703 for securing the current conducting terminal pins (not shown). Furthermore, the front plate 701 has a boss portion 704 in its center, protruding in an axial direction. The boss portion 704 has a function which is identical to that of the boss portion 216. In this example, protrusions 704a extending in an axial direction are provided on the outer periphery of the boss portion 704, and by these protrusions, a pressing into a bore (not shown) at the side of the circuit board is performed. At the opposite side beyond the boss portion 704 of the terminal portion 702, a securing pin 705 is embedded. The function of the securing pin 705 is identical to that of the securing pin 314.

The embodiments of the present invention are not limited to individual embodiments described above and include various modifications that one of ordinary skill in the art could have conceived. Effects of the present invention are also not limited to those described above. This means that various additions, modifications, and partial omissions are possible as long as they do not depart from the scope of the invention as claimed and the technical concept and meaning of the present invention as disclosed herein and equivalents thereof.

The present invention can be applied to stepping motors.

What is claimed is:

1. A stepping motor comprising:
   an axially protruding boss portion accommodating a rotation shaft in the inside, which boss portion is provided to be snapped into a circuit board;
   axially protruding current conducting terminal pins that are made so as to be soldered to the circuit board;
   securing pins that do not function as electrodes, are made so as to be soldered to the circuit board and are arranged at positions whereby they sandwich the boss portion between themselves and the current conducting terminal pins;
   a front plate facing the circuit board; and
   a stator disposed behind the front plate,
   wherein the front plate is equipped with the current conducting terminal pins, the boss portion, and the securing pins.

2. Stepping motor according to claim 1, wherein that the current conducting terminal pins and the securing pins are provided at equal angular positions.

3. Stepping motor according to claim 1, wherein the current conducting terminal pins are connected to the wiring from the stator coil.

4. Stepping motor according to claim 3, wherein, at the side of the motor, the securing pins are connected at wirings except for the wirings from the stator coil.

5. Stepping motor according to claim 1, wherein that axially extending slits are formed in the boss portion.

6. Stepping motor according to claim 1, wherein protrusions extending in an axial direction are provided on the outer periphery of the boss portion.

7. Stepping motor according to claim 1, wherein the motor has a positioning pin to position the motor to the circuit board.

8. Stepping motor according to claim 1, wherein at the securing pins, a plurality of end portions are protruding toward the circuit board.

9. Stepping motor according to claim 1, wherein the securing pins are virtually U-shaped metallic members.

10. Stepping motor according to claim 1, wherein the front plate has a terminal portion and a securing pin arranging portion that radially projects from a circumferential portion of the front plate, the current conducting terminal pins are fixed to the terminal portion and the securing pins are fixed to the securing pin arranging portion.

11. Stepping motor according to claim 1, wherein a positioning pin is arranged in the terminal portion.

\* \* \* \* \*